3,297,736
PRODUCTION OF TRIMETHYL ADIPIC
DINITRILE
Karl Schmitt, Herne, Josef Disteldorf, Wanne-Eickel, and Johannes Reiffer, Essen-Heisingen, Germany, assignors to Scholven-Chemie Aktiengesellschaft, Gelsenkirchen-Buer, Germany, a corporation of Germany
No Drawing. Filed Feb. 10, 1964, Ser. No. 343,458
Claims priority, application Germany, Feb. 11, 1963, Sch 32,753
6 Claims. (Cl. 260—465.2)

This invention relates to the production of trimethyl adipic dinitrile (trimethyl adipic acid dinitrile) and has as its object to provide an improved process for the production of the dinitrile.

For the production of trimethyl adipic dinitrile, consideration is to be given to the known procedure for production of adipic dinitrile from adipic acid. The trimethyl adipic acid can be produced by known processes. Further, it can be produced by oxidation of trimethyl cyclohexanol or trimethyl cyclohexanone, or mixtures of these cyclohexane derivatives with nitric acid at an elevated temperature, for example above 65° C. If the cyclohexane derivative employed is trimethyl cyclohexanol, the temperature can be below 65° C., for example, about 40–50° C. The acid is used in an amount such that the weight ratio between the nitric acid and the cyclohexane derivative is less than about 3.5:1, but not less than the stoichiometrically necessary amount. The process can be operated in a cyclic fashion such that nitric acid obtained from a previous run and containing some trimethyl adipic acid, is used.

Production of trimethyl adipic acid in a procedure as is described above, is described in German DAS 1,111,163. According to this German disclosure, the trimethyl adipic acid is obtained as an oil and the oil is treated to produce the acid in crystalline form. The crystallization can be effected with the aid of distillation in vacuum or by utilizing recrystallization steps. The solid, crystalline acid so obtained, is a mixture of the isomeric form $\alpha,\alpha,\gamma$- and $\alpha,\gamma,\gamma$-trimethyl adipic acid.

Crystalline trimethyl adipic acid can be converted to the corresponding dinitrile by utilization of the procedure known for production of adipic dinitrile from adipic acid, and in this known procedure, either liquid phase or gas phase reaction can be used. Utilization of this known procedure, however, does not provide satisfactory yields of trimethyl adipic dinitrile.

In seeking to improve upon the procedure described above for production of the trimethyl adipic dinitrile, consideration is to be given to eliminating the purification step wherein the crystalline trimethyl adipic acid is formed. Thus, the possibility of utilizing the oily oxidation product resulting from the oxidation of the cyclohexane derivative with nitric acid, is to be considered. Utilization of the oily product, however, is difficult. This is likely occasioned by the fact that the oily product contains in addition to trimethyl adipic acid, substantial quantities of short-chain dicarboxylic acids, particularly trimethyl glutaric acid (about 5–8%), and further contains some color imparting resins (for example 0.3%), and other products resulting, as from condensation, from the oxidation step. Also, the oil may contain some of the catalyst utilized in the oxidation step, and thus may contain catalyst such as ammonium vanadate, or the like.

It has been found that the oily mixture produced by the oxidation of the cyclohexane derivative can be utilized for the production of trimethyl adipic dinitrile, if ammonia is used for the conversion to the dinitrile. The product of the oxidation can be cooled to, for example, 20° C. to provide an organic phase containing the trimethyl adipic acid, and an aqueous phase. The organic phase can be separated from the aqueous phase and then treated with a gas such as air, nitrogen, water vapor, to separate therefrom residual nitrous gases remaining from the nitric acid oxidation. The oil then contains $\alpha,\alpha,\gamma$- and $\alpha,\gamma,\gamma$-trimethyl adipic acid, and some other organic compounds as by-products, particularly short-chain dicarboxylic acids. The treatment of the separated oil with ammonia can be carried out in liquid phase and in the presence of a suitable catalyst for the reaction.

The conditions utilized for the contacting with ammonia can be those conditions known for the production of adipic dinitrile from adipic acid. Preferably, the temperature is in the range of about 230–270° C. The catalyst can be a catalyst as is known for the process wherein adipic dinitrile is produced. Acid catalysts are particularly desirable. For example, phosphoric acid or a material containing phosphoric acid can be used.

Advantages of the procedure of the invention include the realizing of high yields and rapid reaction.

Thus, the invention provides a process for production of trimethyl adipic acid dinitrile which includes contacting ammonia with an oil containing trimethyl adipic acid, at suitable temperature-time conditions to form the dinitrile from the adipic acid. The oil can be the product of oxidation of trimethyl cyclohexanol, trimethyl cyclohexanone, or mixtures of these cyclohexane derivatives.

The invention is further described in the following examples.

*Example 1*

5 kg. of crystalline trimethyl adipic acid (an isomer mixture of $\alpha,\alpha,\gamma$- and $\alpha,\gamma,\gamma$-trimethyl adipic acid in the weight ratio of about 1:1) and 0.5% of 85% phosphoric acid, are placed in a reaction vessel outfitted with an attached column. The material is heated to 260° C., and this temperature is maintained for 6 hours. Simultaneously 800 l./hr. of ammonia gas are passed through the material. After working up by washing and distillation in the customary manner, the dinitrile is obtained in a yield of 68% of theory referred to the charged trimethyl adipic acid. The residue amounted to 14% of theory, and trimethyl cyclopentanone in amount of 18% of theory, is obtained.

*Example 2*

The vessel used in Example 1 is charged with 5 kg. of oily trimethyl adipic acid, consisting of 87% trimethyl adipic acid isomers, and the balance water (5%) and short-chain dicarboxylic acids (8%). This oil was obtained by oxidation of trimethyl cyclohexanone with nitric acid, cooling the oxidation product so that an organic phase and an aqueous phase formed, and treating the organic phase with air to remove nitric oxides. The oil thus obtained was used as the starting material and was subjected to the procedure of Example 1. After 3½–4 hours' reaction time, the material was worked up. The yield was 74% of the theory, referred to the pure trimethyl adipic acid charged; referred to the charge of oily water-containing acid, the yields were: 9% of first runnings which is waste product; 11% residue, and 11% trimethyl cyclopentanone.

While the invention has been described with respect to particular embodiments thereof, these embodiments do not serve to define the limits of the invention, but rather are merely representative of the invention.

What is claimed is:
1. Process for production of $\alpha,\alpha,\gamma$- and $\alpha,\gamma,\gamma$-trimethyl adipic acid dinitrile which comprises:
   (a) treating a cyclohexane derivative selected from the group consisting of trimethyl cyclohexanol, trimethyl cyclohexanone and mixtures thereof with nitric acid to oxidize the cyclohexane derivative and form $\alpha,\alpha,\gamma$- and $\alpha,\gamma,\gamma$-trimethyl adipic acid as an oil, said oil containing nitrous gases formed during the nitric acid oxidation, and as by-products of the oxidation, short chain dicarboxylic acids, (b) freeing said oil of nitrous gases formed during the nitric acid oxidation, (c) contacting said oil while still containing by-product short chain dicarboxylic acids with ammonia at a temperature and for a time sufficient to form the trimethyl adipic dinitrile from the trimethyl adipic acid present in the oil.

2. Process according to claim 1, wherein said contacting with ammonia is carried out in the presence of an acid catalyst.

3. Process according to claim 1, wherein said contacting is carried out at a temperature of about 230–270° C.

4. Process according to claim 1, wherein said contacting with ammonia is carried out in the presence of an acid catalyst and at a temperature of about 230–270° C.

5. Process according to claim 1, wherein the nitric acid oxidation produces a mixture of water and said oil and the water is separated from the oil, and said contacting with ammonia is carried out in the presence of an acid catalyst at a temperature of about 230–270° C. to form $\alpha,\alpha,\gamma$- and $\alpha,\gamma,\gamma$-trimethyl adipic dinitrile.

6. Process according to claim 5, said acid catalyst containing phosphoric acid.

References Cited by the Examiner

UNITED STATES PATENTS

| 2,132,849 | 10/1938 | Greenewalt et al. | 260—465.2 |
| 2,794,043 | 5/1957 | Jansen et al. | 260—465.2 |
| 2,808,426 | 10/1957 | Potts et al. | 260—465.2 |

FOREIGN PATENTS 1,111,163  10/1961  Germany.

CHARLES B. PARKER, *Primary Examiner.*

JOSEPH P. BRUST, *Examiner.*